United States Patent [19]
Ridge

[11] Patent Number: 5,290,010
[45] Date of Patent: * Mar. 1, 1994

[54] MULTIPLE THRUST RANGE LIVE LOADE PACKING SYSTEM FOR STEMS, SHAFTS, ETC.

[75] Inventor: William A. Ridge, Inman, Kans.

[73] Assignee: Cashco, Inc., Ellsworth, Kans.

[*] Notice: The portion of the term of this patent subsequent to Mar. 8, 2010 has been disclaimed.

[21] Appl. No.: 26,532

[22] Filed: Mar. 4, 1993

Related U.S. Application Data

[63] Continuation-in-part of Ser. No. 897,864, Jun. 12, 1992, Pat. No. 5,192,049.

[51] Int. Cl.$^5$ .............. F16K 41/02; B65D 53/00
[52] U.S. Cl. ..................... 251/214; 277/106
[58] Field of Search ............... 251/214; 277/102, 105, 277/106, 123

[56] References Cited

U.S. PATENT DOCUMENTS

| | | | |
|---|---|---|---|
| 534,575 | 2/1895 | Platts et al. | 277/106 |
| 548,089 | 10/1895 | Platts et al. | 277/106 |
| 601,614 | 3/1898 | Dudley | 277/106 |
| 2,441,705 | 5/1948 | Jacobsen | 277/106 X |
| 3,659,862 | 5/1992 | Sebastian | 277/106 |
| 3,713,660 | 1/1993 | Luthe | 277/206 R |
| 3,787,060 | 1/1974 | Astill et al. | 251/214 X |
| 3,968,970 | 7/1976 | Vogeli | 277/106 |
| 4,061,157 | 12/1977 | Hanssen | 251/214 X |
| 4,582,329 | 4/1986 | Stalph | 277/106 |
| 4,722,507 | 2/1988 | Lindackers et al. | 277/102 X |
| 4,745,944 | 5/1988 | Francart, Jr. | 251/214 X |
| 4,773,442 | 9/1988 | Lephilibert | 277/106 X |
| 5,024,453 | 6/1991 | Suggs | 277/106 |
| 5,056,757 | 10/1991 | Wood | 251/214 |
| 5,129,625 | 7/1992 | Wood et al. | 251/214 |
| 5,192,049 | 3/1993 | Ridge | 251/214 |

*Primary Examiner*—John Rivell
*Attorney, Agent, or Firm*—Mason, Kolehmainen, Rathburn & Wyss

[57] ABSTRACT

A multiple thrust range, live loaded packing system for stems and shafts extending into a packing chamber containing a packing ring, and a packing gland engaging the ring and having an outer end portion projecting outwardly of the chamber includes a first thrust member engaging an outer end portion of the gland and a second thrust member spaced from and facing the first thrust member. A spring is mounted between the thrust members for normally biasing the thrust members apart and a spacer is mounted between the thrust members around the spring for establishing a minimum spacing distance between the thrust members. One or more tension members extend between the thrust members to secure the thrust members against the spacer for exerting a selected live load on the packing gland via the spacer, the spring and the first thrust member. At least one of the thrust members has a plurality of opposite stop surfaces selectively engageable with the spacer to provide different thrust range values of live loading depending on which stop surface is engaged with the spacer.

18 Claims, 4 Drawing Sheets

MULTIPLE THRUST RANGE LIVE LOADE PACKING SYSTEM FOR STEMS, SHAFTS, ETC.

RELATED APPLICATION

This application is a continuation-in-part of copending U.S. patent application, Ser. No. 07/897,864, filed Jun. 12, 1992, now U.S. Pat. No. 5,192,049.

BACKGROUND OF THE INVENTION

1. Field of the Invention

The present invention is directed towards a new and improved multiple thrust range, live loaded packing system for a valve stem and for a valve employing such system so that at least two ranges of thrust values may be provided to exert a live load on a packing ring around the valve stem. The packing system also provides a means to determine if the preferred or prescribed thrust values are being applied.

2. Background of the Prior Art

Over the years, a wide variety of piston rod packing systems, stuffing box sealing systems, valve stem sealing and piston ring sealing systems have been developed and some of these systems have utilized a live load thrust against a packing member to facilitate sealing around the piston rod or valve stem. U.S. Pat. No. 601,614 to Dudley; U.S. Pat. No. 3,659,862 to Sebastian; U.S. Pat. No. 3,713,660 to Luthe; U.S. Pat. No. 3,968,970 to Vogeli; U.S. Pat. No. 4,582,329 to Stalph; U.S. Pat. No. 4,722,507 to Lindackers et al. and U.S. Pat. No. 5,056,757 to Wood, disclose packing or stuffing box systems in accordance with the prior art.

Additionally, the following U.S. patents disclose various configurations of packing systems, valves and specialized live loading packing arrangements for rotary shafts and stems:

| | |
|---|---|
| Platts et al. | 534,575 |
| Platts et al. | 548,089 |
| Jacobsen | 2,441,705 |
| Astill et al. | 3,787,060 |
| Hansen | 4,061,157 |
| Francart, Jr. | 4,745,944 |
| Lephilibest | 4,773,442 |
| Suggs | 5,024,453 |
| Wood et al. | 5,129,625 |

However, none of the aforementioned patents appear to disclose a live loaded valve or stem packing arrangement wherein the simple reversal of one or more components results in a packing system having multiple ranges of thrust value capability.

OBJECTS OF THE INVENTION

It is an object of the invention to provide a new and improved multiple thrust range value, live loaded packing system for valve stems, piston rods, rotating shafts and the like.

It is another object of the present invention to provide a new and improved valve employing a multiple thrust value, live loaded packing system.

Another object of the present invention is to provide a multi-value thrust, live loaded, packing system of the character described which will also provide a means to detect when the desired load is not being applied.

Another object of the present invention is to provide a new and improved multi-value thrust range, live loaded, packing system of the character described in which the load rating can be easily and rapidly changed to several different values when required for different operating pressures.

Yet another object of the present invention is to provide a new and improved multiple thrust range, live loaded, packing system of the character described which is relatively simple and straightforward in construction, relatively low in cost and exceptionally easy to maintain and change from one live load range to another.

BRIEF SUMMARY OF THE PRESENT INVENTION

The foregoing and other objects and advantages of the present invention are accomplished in an illustrated embodiment thereof comprising a multiple thrust range, live loaded, packing system for valve stems, piston rods, shafts and the like wherein a valve body or base and a movable thrust element of a pair of thrust elements are interconnected through a loading assembly for exerting a live load on a packing ring through a packing gland. The loading assembly includes a first thrust member engaging an outer end portion of the packing gland and a second thrust member spaced from and facing the first thrust member. A spacer is mounted between the thrust members and encloses a live loading spring for establishing a minimum spacing distance between the thrust members. At least one of the first and second thrust members is provided with opposite stop surfaces selectively engageable with the spacer to provide different thrust range values of live loading depending on which stop surface is engaged with the spacer. The loading assembly also includes at least one elongated tension member having one end which is fixedly secured to the valve body or base and an opposite end which transmits thrust of a selected value to the packing gland which is engaged by the thrust members. Selective control of the thrust value exerted is attained by means of a nut threaded onto the tension member as well as by the strength of the spring. The spring may take the form of a unitary coil spring or a stack of "Bellville" type spring washers is mounted in coaxial alignment with the valve stem or shaft in parallel with one or more tension member(s). The thrust members and spacer provide an enclosure to surround and enclose the coil spring or stack of spring washers and also set up a minimum spacing between thrust members for exerting a selected amount of thrust on the packing gland around the shaft or stem.

BRIEF DESCRIPTION OF THE DRAWINGS

For a better understanding of the present invention, reference should be had to the following detailed description taken in conjunction with the drawings, in which.

DETAILED DESCRIPTION OF PREFERRED EMBODIMENTS OF THE INVENTION

Referring now to the drawings and FIGS. 1-4, therein is illustrated one embodiment of a new and improved valve 210 constructed in accordance with the features of the present invention and including a valve body 212 having a cylindrical bore 214 adapted to contain an elongated stem 216 having a threaded segment 218 adjacent an upper end and rotatable within the bore when turned. The bore 214 is formed with an upper end portion comprising a packing chamber 220 for containing one or a plurality of packing rings 224 in a stacked array. The packing rings 224 are formed of suitable packing material that is compatible with the fluid being handled in the valve 210.

The elongated stem 216 is rotatable and is longitudinally or axially displaceable in the bore 214 in the packing chamber 220. Live loaded end thrust against an outer one of the respective packing rings 224 is provided in accordance with the present invention by means of a new and improved multiple load range, packing assembly, generally indicated by the reference numeral 226. The packing assembly 226 exerts a selected range of thrust force against a hollow packing gland 230 mounted on the stem 216 and coaxially aligned on a centerline or axis 235.

The cylindrical packing gland 230 has a lower end portion extending downwardly into the packing chamber 220 with an annular lower end face bearing against an uppermost packing ring 224 to urge the ring and stack of rings downwardly towards a fixed annular shoulder (not shown) at the lower end of the chamber. The packing gland 230 projects upwardly through a stepped, frustoconical central bore 232 of a washer-like thrust plate 234 having a pair of radially outwardly extending opposite, annular, relatively flat, stop faces 233 and 235.

In accordance with the present invention, the packing assembly 226 includes a plurality of elongated tension members 240 threaded at opposite end portions and extending through coaxially aligned bores 237 in the thrust plate 234 on opposite sides of the central bore 232. On a lower threaded end portion, each tension bolt 240 is threadedly engaged in a threaded bore 239 and an opposite or outer threaded end portion is provided with an adjustment nut 242 having a lower thrust face bearing downwardly against a stop surface 245 on a movable, upper thrust plate 246 similar or identical to the lower thrust plate 234. The upper washer-like thrust plate 246 includes a relatively flat opposite stop surface 247 parallel of the stop surface 245.

Figure 1:
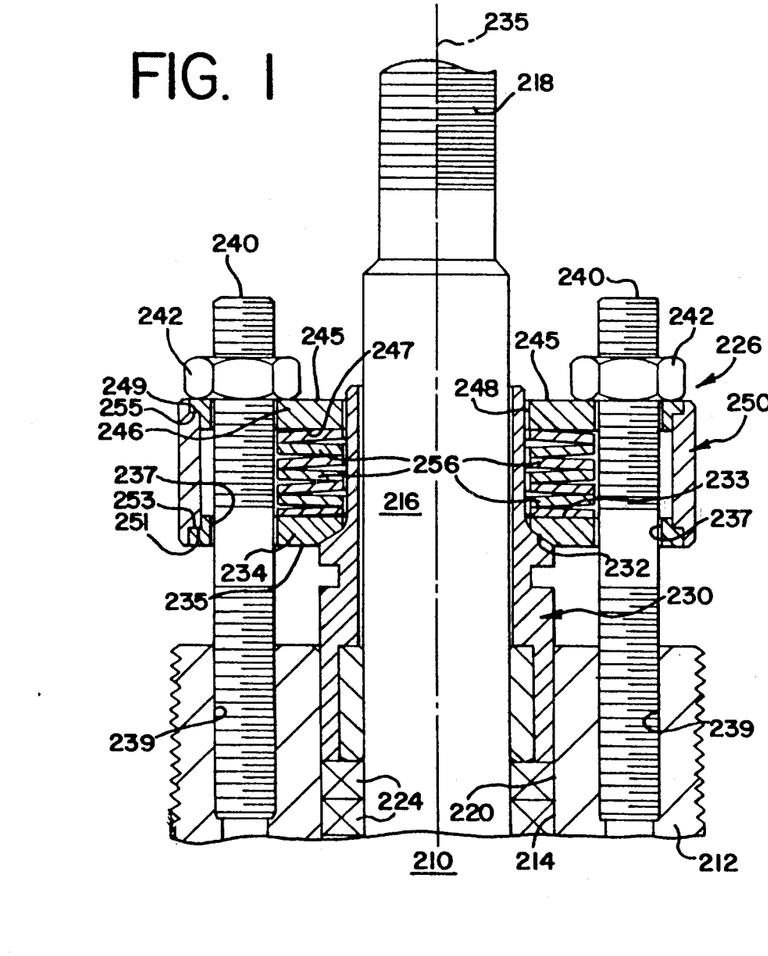
FIG. 1 is a longitudinal cross-sectional view of one embodiment of a new and improved multiple thrust range rated live loaded packing system constructed in accordance with the features of the present invention.
Figure 2:
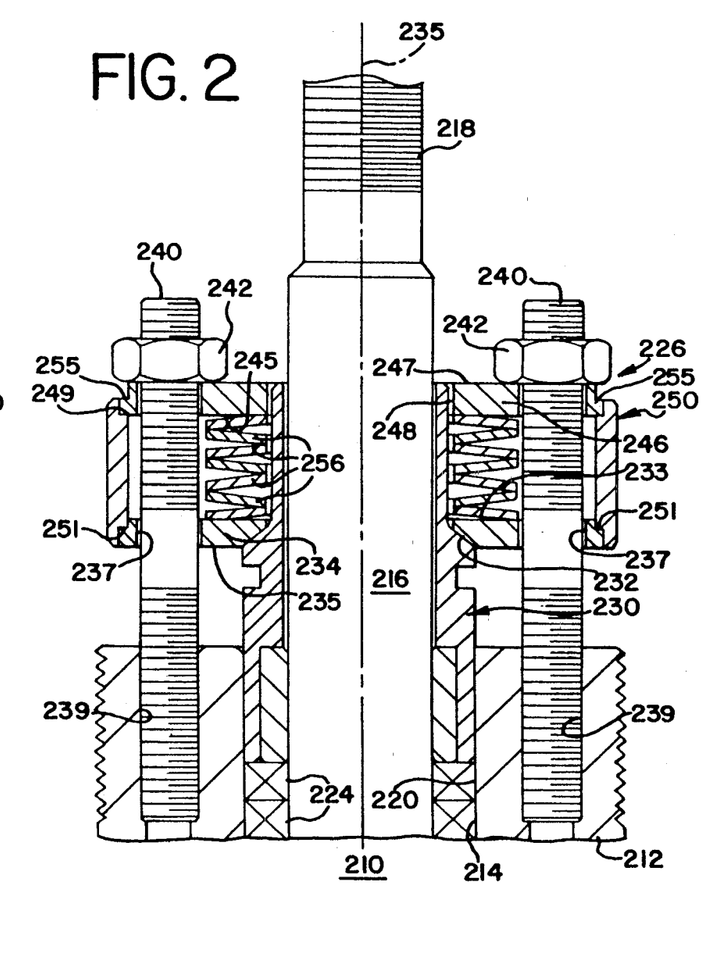
FIG. 2 is a longitudinal cross-sectional view of the packing system of FIG. 1, illustrated in another operating condition having a different live loading thrust range.

In accordance with the present invention, a cylindrical spacer 250 is sandwiched between the washer-like thrust plates 234 and 246 for engagement with selected stop surfaces of the thrust plates around the periphery thereof in order to establish a minimum spacing value between the facing stop surfaces when the nuts 242 are snugly tightened down on the tension members 240. The upper thrust plate 246 includes a central bore 248 that is large enough in diameter to clear the upper end portion of the packing gland 230 which projects upwardly therein as shown in FIGS. 1 and 2. Thus, the upper thrust plate 246 exerts no force directly on packing gland 230 as does the lower thrust plate 234.

Figure 3:
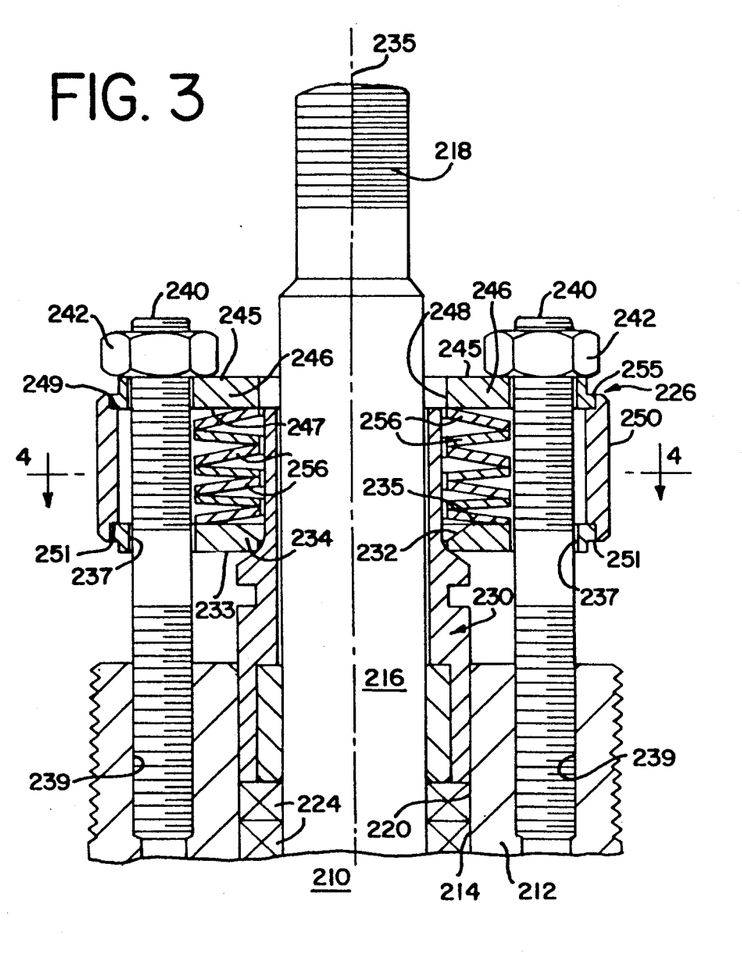
FIG. 3 is a longitudinal cross-sectional view of the packing system of FIG. 1, illustrating yet another operating condition having yet another different live loading thrust range.
Figure 4:
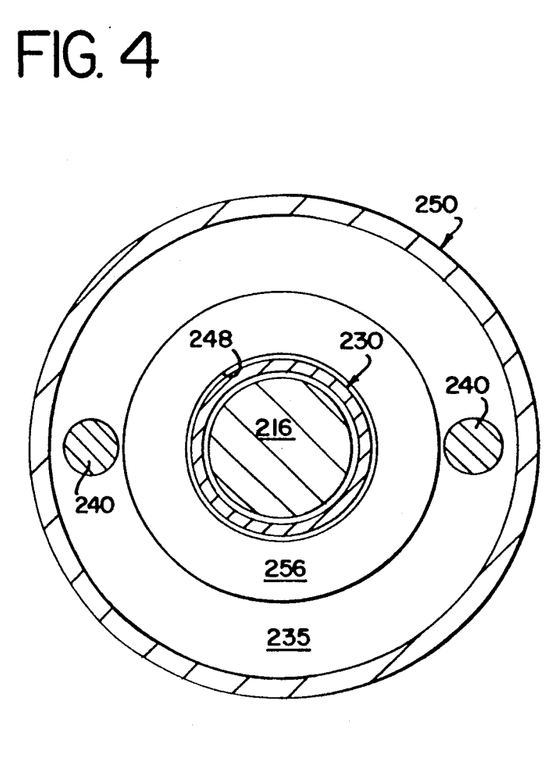
FIG. 4 is a transverse cross-sectional view taken substantially along lines 4—4 of FIG. 3.

Opposite annular outer end faces of the cylindrical spacer 250 are formed with grooves around the inside surfaces to provide a pair of opposite, inner stop surfaces 249 and 251 which are spaced apart in an axial direction by a spacing distance less than the axial spacing distance between the outer annular end surface of the spacer.

The spacer 250 together with the thrust plates 234 and 246 for an enclosure around the stem 216 and packing gland 230 for housing and containing a live load biasing unit which is made up of a stack of "Bellville" type spring washers 256. The spring washers 256 are mounted in coaxial relationship around the stem 216 and packing gland 230 and tend to provide a live load bias on the thrust plates 234 and 246 toward movement away from one another. The relative position of the nuts 242 and the packing gland 230 tend to limit the effect of the spring washer bias force and the spring constant of the stack of washers 256 as a whole is selected and determined by the thickness, size and number of individual washers contained between the thrust plates 234 and 246 as well as the spacing distance between adjacent facing stop surfaces of the respective thrust plates.

In order to provide a multiplicity of different live load thrust values for a given stack of spring washers 256 and a given size spacer 250, the thrust plates 234 and 246 are formed with an outer groove on the stop faces 233 and 247 thereof and these grooves have annular radial shoulder surfaces 253 and 255, respectively, which are sized to cooperate with groove faces 251 and 249, respectively.

Referring to FIG. 1, the lower thrust plate 234 is positioned with the shoulder stop surface 253 facing upwardly to engage the groove stop surface 251 on the lower end of the spacer 250. The upper thrust plate 246 is positioned with the shoulder stop surface 255 facing downwardly to face and engage the groove stop surface 249 of the spacer 250. In this arrangement, a minimum distance spacing is provided between the faces 233 and 247 of the thrust plates so that a maximum compression of the stack of "Bellville" washers 245 is attained. This results in a maximum live load thrust force being exerted on the packing gland 230 by the lower thrust plate 234 when the nuts 242 are fully tightened so that the cooperating stop surfaces 253 and 251 on the one hand and the cooperating stop surfaces 249 and 255 on the other hand are tightly pressed against one another.

Referring to FIG. 2, in order to obtain a lower value thrust force on the packing gland 230 than in the configuration shown in FIG. 1, the upper thrust plate 246 is turned over so that the substantial planar stop surface 245 is engaged against the outer stop surface at the upper end of the spacer 250. In this arrangement, the spacing distance between the facing stop surface 233 and 245 of the thrust plates 234 and 246 is increased so that less compression force is exerted on the stack of washers 256 when the nuts 242 are fully tightened. In this configuration, a medium range live load thrust force is applied on the packing gland 230.

Referring to FIG. 3, the lower thrust plate 234 is turned over so that the substantially planar stop surface 235 is engaged against the shoulder stop surface 251 of the groove in the lower end of the spacer 250, thus resulting in a greater spacing value between the facing stop surfaces 235 and 247 of the thrust plates 234 and 246 than is the case in the arrangement of FIG. 2. Of course, this results in an even lower value of live load thrust and lesser compression of the stack of spring washers 256.

It is thus seen that a multiple value thrust force can readily be obtained with the packing system 226 of the present invention by simply turning over one or both of the thrust plates 234 and 246 which engage the live loading stack of spring washers 256. It should also be understood that a single coil spring having a selected spring constant could also be used but without the flexibility of the stack of "Bellville" spring washers 256 which permits one or more washers to be withdrawn from the stack and if desired, one or more spring washers having different biasing characteristics could be substituted in the stack.

Figure 5:
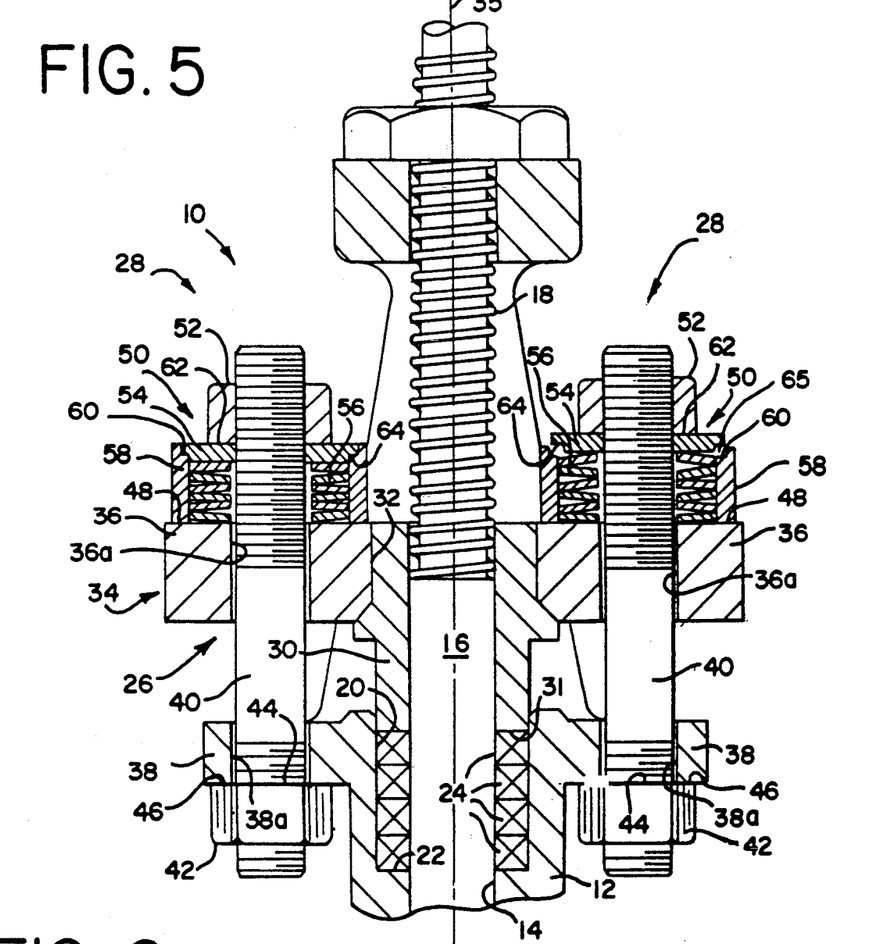
FIG. 5 is a longitudinal cross-sectional view of another embodiment of a new and improved dual rated live loaded packing system constructed in accordance with the present invention.
Figure 6:
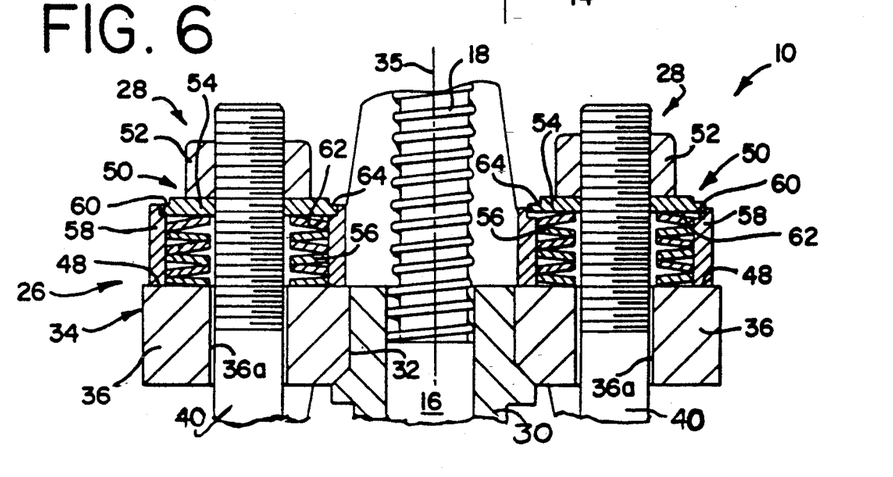
FIG. 6 is a fragmentary longitudinal cross-sectional view similar to FIG. 5 illustrating the packing system in another operating condition at a different load rating from that of FIG. 5.
Figure 7:
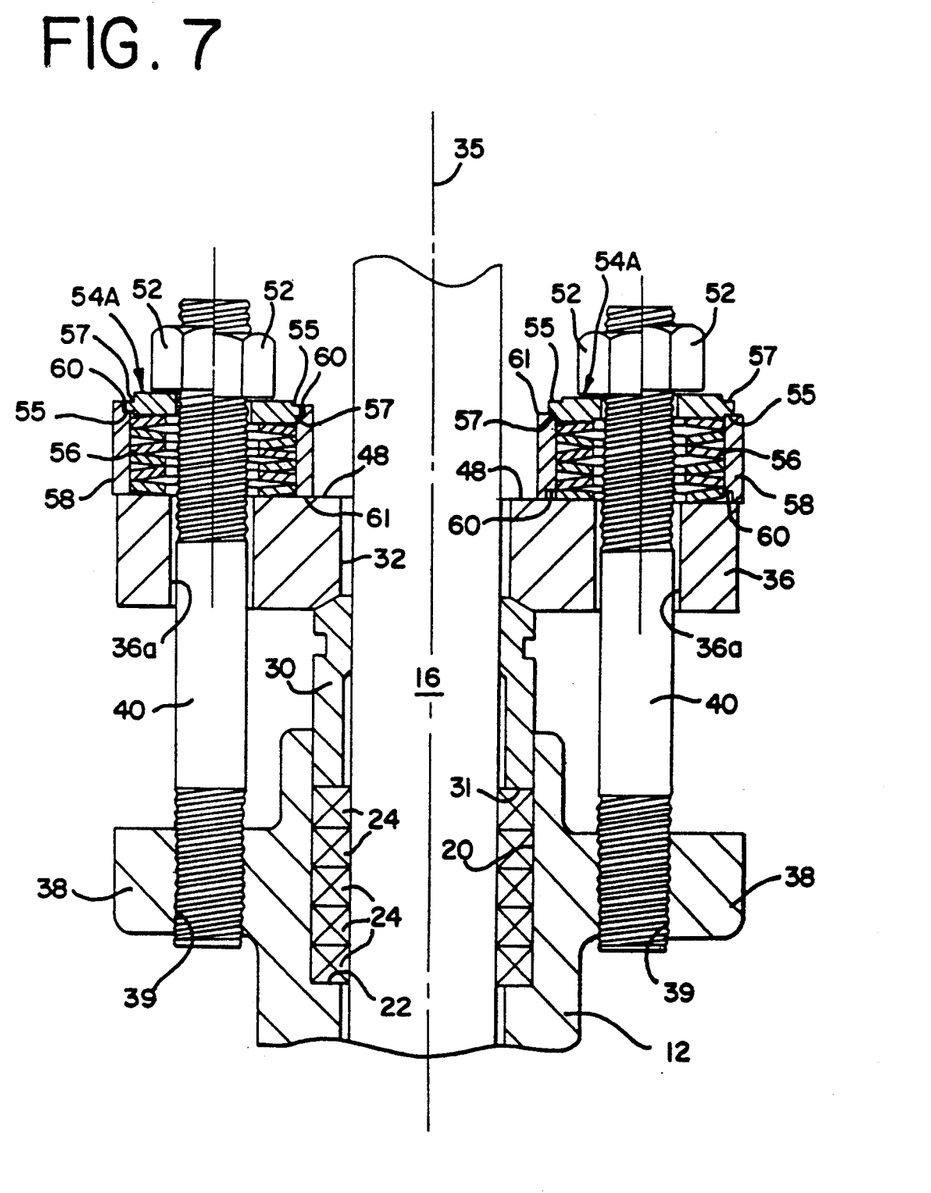
FIG. 7 is a fragmentary enlarged longitudinal cross-sectional view similar to FIG. 6, graphically illustrating a plurality of operating conditions, all having different thrust load values but using the same hardware.

Referring now to the drawings and FIGS. 5-7, in particular, therein is illustrated another embodiment of a new and improved valve 10 constructed in accordance with the features of the present invention and including a valve body 12 having a cylindrical bore 14 adapted to contain an elongated stem 16 having a threaded segment 18 adjacent an upper end and rotatable within the bore when turned. The bore 14 is formed with an enlarged upper end portion having an annular shoulder 22 at an inward end thereof and the enlarged portion of the bore comprises a packing chamber 20 for containing one or a plurality of packing rings 24 in a stacked array. The packing rings 24 are formed of suitable packing material that is compatible with the fluid being handled in the valve 10.

The elongated stem 16 is rotatable and is longitudinally or axially displaceable in the bore 14 in packing chamber 20. A live loaded end thrust against an outer one of the respective packing rings 24 is adjustable in accordance with the present invention by means of a new and improved packing assembly generally indicated by the reference numeral 26 in FIG. 5. The packing assembly 26 including a plurality of dual rated, live load thrust assemblies 28 disposed equilaterally around a centerline or axis 35 of the stem 16 to exert a desired value of end thrust against the stack of packing rings 24 seated around the stem 16 within the packing chamber 20.

The packing assembly 26 includes a cylindrical packing gland 30 having a lower end portion extending downwardly into the packing chamber 20 with an annular lower end face 31 bearing against an uppermost packing ring 24 to urge the ring and stack of rings downwardly towards the fixed annular shoulder 22 of the chamber. The packing gland 30 projects upwardly through a central bore 32 of a radial thrust plate 34 having a plurality of radially outwardly extending ears or arms 36 in equilateral array around the central axis 35 of the valve stem 16. At the upper end of the valve body 12 there is provided a number of radially outwardly extending, integral ears 38 aligned with respective ears 36 of the thrust plate 34.

In accordance with the present invention, each thrust assembly 28 includes an elongated tension member 40 threaded at opposite end portions and extending through coaxially aligned bores 36a and 38a provided in aligned, respective pairs of upper, movable ears 36 and lower, fixed ears 38. On a lower threaded end portion, each tension bolt 40 is provided with an adjustable nut 42 having an upper thrust face 44 bearing against a lower face or thrust surface 46 on an ear 38.

Each upper ear 36 on the movable thrust plate 34 includes an upper thrust surface 48. Thus, each movable ear 36 and a respective aligned fixed ear 38 includes an upper thrust face 48 and a lower thrust face 46 spaced therefrom and in parallel, and both faces extend radially outwardly of and normal to the elongated axis 35 of the stem 16.

In accordance with the present invention, at the upper end of each thrust assembly 28 on a threaded upper end portion of the tension bolt 40 there is provided a dual rated resilient biasing assembly 50 for exerting a downward biasing force on the packing gland 30 against the stack of packing rings 24 contained in the packing chamber 20. Each dual rated resilient biasing assembly 50 includes an upper, adjustable thrust nut 52 threaded onto the tension bolt 40, a stop washer 54 intermediate the thrust nut and the upper thrust surface 48 and a stack of "Bellville" type, annular, spring washers 56 intermediate the underside of the stop washer 54 and the upper thrust surface 48.

Each stack of spring washers 56 is contained and enclosed generally within the inside wall surface of a cylindrical spacer 58 having a lower end seated on the upper thrust surface 48. The spacer 58 is formed with an internal annular groove 60 at the upper end adapted to confront and cooperate with opposite faces or stop surfaces on the stop washer 54. Each stop washer 54 has an outer diameter slightly less than the diameter of the groove 60 in the spacer 58 and is adapted to seat in the groove in either of two selected positions to provide a dual rated live loaded thrust capability. Each stop washer 54 is formed with a first stop surface comprising a flat or planar face 62 on one side and on the opposite side is provided with an annular groove 64 extending around a peripheral edge of the stop washer. The groove 64 forms a second stop surface parallel of the first stop face 62 and engageable with the lower surface of the groove 60 in the spacer 58.

Referring now specifically to FIG. 5, and to the right hand side of the centerline or axis 35, when the stop washer 54 is positioned with the flat stop face 62 facing upwardly, and with the downwardly facing surface of the annular edge groove 64 spaced at a level above the upwardly facing stop surface of the groove 60 on the spacer 58, this condition indicates that less than the desired compression or stress is being exerted on the packing rings 24 from the packing gland 30. Thus, the right hand portion of FIG. 5 clearly illustrates the thrust assembly 28 while operating in an insufficient thrust condition. In this condition, the vertical dimension between the upper thrust surface 48 on the ear 36 and the underside of the stop washer 54 is greater than the distance between the lower edge of the end of the spacer 58 and the upwardly facing surface of the groove 60. It should also be noted that a definite open space 65 exists between the confronting and facing grooves 60 and 64 of the stop washer 54 and spacer 58, respectively. This space 65 and the offset (mismatch) of the spacer 58 and washer 54 provide a visual indicator that adjustment is required. The looseness of the spacer 58 is a feature that displays the need to adjust by touch.

Referring now to the left hand side of FIG. 5, when the nut 52 is tightened to such an extent that the stop washer 54 is moved downwardly until the confronting grooves 60 and 64 of the stop washer and spacer 58 are tightly seated, then a maximum value of thrust or biasing force is exerted by the tension assemblies 28 on the packing gland 30 to provide a high value range of live loading for use in high pressure operation of the valve 10. It should be noted that in the fully tightened position as shown in the left hand side of FIG. 5, the nut 52 is tightened to such an extent that the spacer 58 will not readily turn and this provides a predetermined amount of preload biasing force or thrust on the tension member 40 of each thrust assembly 28 to afford a desired live load rating on the packing rings 24. Various load ratings may be provided by selecting different numbers and combinations of strength ratings in a stack of "Bellville" washers 56 or by a combination of different strengths of a stack of washers and selecting spacers 58 of different heights above the thrust surfaces 48.

The live loading packing system 26 in accordance with the present invention thus provides a maximum predetermined preload value (left hand portion—FIG. 5) or an insufficient load value (right hand portion—FIG. 5) for a desired value pressure rating when the stop washers 54 in each thrust assembly 28 are facing upwardly.

In order to provide a second and lower value loading range without any changes to an existing stack of spring washers 56 being used, and thus provide an easily changeable dual live loading range capability, each thrust assembly 28 can be easily switched over by removing the nuts 52 from the upper threaded ends of the tension rods 40. After removal of the nuts, the stop washers 54 are turned upside down and remounted on the upper end portion of the tension rods 40 (as shown in FIG. 6) with the flat, stop surfaces 62 of the stop washers 54 facing downwardly (instead of upwardly) towards the thrust face 48 of each ear 36. In the downwardly facing position as shown in FIG. 2, the spacing distance between the flat face 62 of the stop washers 54 and the thrust surface 48 is slightly greater than before (FIG. 5) when the stop washers are positioned with the stop grooves 64 facing downwardly.

Referring specifically to FIG. 6 and the right hand side of the valve 10 towards the right of the centerline 35, the space 65 is noticeable both by the mismatch of the two mating parts, i.e., the washer 54 and the spacer 58 and by the looseness of the spacer 58 and this condition indicates that adjustment is required. However, when the nuts 52 are tightened down to the position as shown in the left hand side of the centerline 35 in FIG. 6, then a preload of a lower rated value of thrust against the packing rings 24 will be provided through the packing glands 30 as the nuts 52 are fully tightened so that the spacers 58 can no longer be turned by hand. The preload value of the thrust assembly 28 as illustrated on the left hand side in FIG. 6, is different and less than the preload value of the thrust assembly 28 as illustrated on the left hand side of FIG. 5, and thus a dual rated live load, biasing system is achieved with a reversal of the position of the stop washers 54 as described.

Referring to FIG. 7, therein is illustrated another embodiment of the present invention, wherein a modified stop washer 54A is utilized having respective shallow and deep annular grooves 55 and 57, formed around the edge on opposite faces.

As illustrated in FIG. 7 on the left hand side of the centerline 35 and the left hand side of the tension stud 40, when the shallow stop groove 55 of the washer 54a is facing downwardly and seated against the groove face 60 of the spacer 58, one value of preloading obtains and when the stop washer 54A is turned over and facing in an opposite direction with the deep groove 57 seated against the spacer groove face 60 another value of preloading is provided.

As illustrated in FIG. 7 on the right hand side of the centerline 35, two additional values of preloading are provided by reversing the orientation of the spacer 58 so that a flat end face 61 opposite the groove 60 is available to engage the respective shallow and deep grooves 55 and 57 of the stop washer 54A.

From the foregoing it will be apparent that a total of four different preload values may be provided in the embodiment of FIG. 7 while utilizing the same number of component parts. In addition, the tension member 40 may be directly threaded into the ears 38 which are provided with a threaded bore 39. Also a fixed head bolt or cap screw can be used instead of a threaded stud 40 and separate nut 52.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A multiple thrust range, live loaded packing system for stems and shafts extending into a packing chamber containing a packing ring, and a packing gland engaging said ring and having an outer end portion projecting outwardly of said chamber, comprising:
   a first thrust member engaging said outer end portion of said gland;
   a second thrust member spaced from and facing said first thrust member;
   spring means between said thrust members for normally biasing said thrust members apart;
   spacer means between said thrust members around said spring means for establishing a minimum spacing distance between said thrust members;
   tension means extending between said thrust members for securing said second thrust member in a selected position relative to said chamber for exerting a selected live load on said packing gland via said spacer means, said spring means and said first thrust means; and
   at least one of said first and second thrust members having opposite stop surfaces selectively engageable with said spacer means to provide different thrust range values of live loading depending on which stop surface is engaged with said spacer means.

2. The packing system of claim 1, wherein:
   said spacer means includes first and second stop surfaces for engagement with said first and second thrust members.

3. The packing system of claim 1, wherein:
   said one of said first and second thrust members has a groove at an edge thereof forming said opposite stop surfaces.

4. The packing system of claim 1, wherein:

said spacer means has spaced apart opposite end faces and said end faces are engageable with said first and second thrust members.

5. The packing system of claim 4, wherein:
at least one of said end faces of said spacer means has a groove forming one of said opposite stop surfaces.

6. The packing system of claim 4, wherein:
both of said end faces have said grooves forming opposite stop surfaces.

7. The packing system of claim 1, wherein:
said spacer means and said thrust members form an enclosure around said packing gland containing said spring means.

8. The packing system of claim 1, including:
visual indicating means for indicating when an adjustment on said spacer is desired.

9. A multiple thrust range rated, live loaded packing system for a valve of the type including a stem extending into a packing chamber having an annular shoulder at an inner end around said stem and an outwardly opening opposite end for receiving a packing gland exerting thrust toward said shoulder against a packing ring mounted in said chamber, said valve including a body defining packing chamber supporting said gland movable toward and away from said body, the improvement comprising:
 a gland loading assembly between said body and a first thrust member for exerting a live load on said packing ring through said packing gland;
 said loading assembly including said first and a second of said thrust members in spaced apart relation and an elongated tension member having a first end portion secured to said body and a second end portion in engagement with said second said thrust members;
 resilient spring means mounted between said thrust members for biasing the same away from each other;
 spacer means engaging a selected stop surface of at least one of said thrust members for setting up a predetermined spacing therebetween; and
 said spacer means having first and second stop surfaces for selectively engaging a stop surface on said one of said thrust members to provide different spacing intervals between said spaced apart thrust members dependent on which of said first and second stop surfaces is engaging said selected stop surface of said one thrust member.

10. The live loaded packing system of claims 9, wherein:
 spring means is mounted on said gland between said first and second thrust members normally biasing said members away from one another; and;
 said spacer means is mounted on said gland between said first and second thrust members for setting up a minimum spacing therebetween.

11. The packing system of claim 10, wherein:
said spacer means surrounds said spring means and has a first stop surface at one end engaged against one of said thrust members and a second stop surface adjacent thereto adapted to be engaged when said engaged thrust member is repositioned to provide a different range of thrust values exerted on said gland relative to said body.

12. The packing system of claim 11, wherein:
said spacer means includes an annular groove around the periphery adjacent said first stop surface forming said second stop surfaces for engagement with said engaged thrust member.

13. The packing system of claim 1, wherein:
said engaged thrust member includes an annular groove adapted to cooperate with a selected one of said first and second stop surfaces of said spacer means for providing different thrust values of live loading on said packing gland.

14. The packing system of claim 15, wherein:
said spacer means includes a plurality of stop surfaces at an end opposite said first and second stop surfaces whereby a third thrust range value of live loading is provided dependent on the relative positions of said spacer means and said thrust members.

15. The packing system of claim 9, including:
visual indicating means for indicating when an adjustment on said spacer is desired.

16. A multiple thrust range, live loaded packing system for stems and shafts extending into a packing chamber containing a packing ring, and a packing gland engaging said ring and having an outer end portion projecting outwardly of said chamber, comprising:
 a first thrust member engaging said outer end portion of said gland;
 a second thrust member spaced from and facing said first thrust member;
 spring means between said thrust members for normally biasing said thrust members apart;
 spacer means between said thrust members around said spring means for establishing a minimum spacing distance between said thrust members;
 tension means extending between said thrust members for securing said second thrust member in a selected position relative to said chamber for exerting a selected live load on said packing gland via said spacer means, said spring means and said first thrust means; and
 each of said first and second thrust members having opposite stop surfaces selectively engageable with said spacer means to provide different thrust range values of live loading depending on which stop surface is engaged with said spacer means.

17. A multiple thrust range, live loaded packing system for stems and shafts extending into a packing chamber containing a packing ring, and a packing gland engaging said ring and having an outer end portion projecting outwardly of said chamber, comprising:
 a first thrust member engaging said outer end portion of said gland;
 a second thrust member spaced from and facing said first thrust member;
 spring means between said thrust members for normally biasing said thrust members apart;
 spacer means between said thrust members around said spring means for establishing a minimum spacing distance between said thrust members, said spacer means including first and second stop surfaces for engagement with said first and second thrust members;
 tension means extending between said thrust members for securing said second thrust member in a selected position relative to said chamber for exerting a selected live load on said packing gland via said spacer means, said spring means and said first thrust means; and
 each of said first and second thrust members having opposite stop surfaces selectively engageable with said first and second stop surfaces of said spacer means to provide different thrust range values of live loading depending on which opposite stop surface is engaged with said spacer means.

18. A multiple thrust range, live loaded packing system for stems and shafts extending into a packing chamber containing a packing ring, and a packing gland engaging said ring and having an outer end portion projecting outwardly of said chamber, comprising:

a first thrust member engaging said outer end portion of said gland;

a second thrust member spaced from and facing said first thrust member;

spring means between said thrust members for normally biasing said thrust members apart;

spacer means between said thrust members around said spring means for establishing a minimum spacing distance between said thrust members;

tension means extending between said thrust members for securing said second thrust member in a selected position relative to said chamber for exerting a selected live load on said packing gland via said spacer means, said spring means and said first thrust means; and each of said first and second thrust members having opposite stop surfaces selectively engageable with said spacer means to provide different thrust range values of live loading depending on which stop surface is engaged with said spacer means, both of said first and second thrust members having a groove at an edge thereof forming said opposite stop surfaces.

* * * * *